United States Patent
Voisin

(10) Patent No.: US 6,426,103 B2
(45) Date of Patent: *Jul. 30, 2002

(54) PROCESS OF ELIMINATION OF BACTERIA IN SHELLFISH AND OF SHUCKING SHELLFISH

(75) Inventor: Ernest A. Voisin, Houma, LA (US)

(73) Assignee: Innovatit Seafood Systems LLC, Houma, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/736,708

(22) Filed: Dec. 15, 2000

Related U.S. Application Data

(60) Division of application No. 09/302,116, filed on Apr. 29, 1999, now abandoned, which is a continuation-in-part of application No. 09/121,725, filed on Jul. 24, 1998.

(60) Provisional application No. 60/086,484, filed on May 26, 1998, provisional application No. 60/074,582, filed on Feb. 13, 1998, and provisional application No. 60/071,819, filed on Jan. 20, 1998.

(51) Int. Cl.$^7$ .............................. A23B 4/00; A23L 1/33; A23L 1/333; A22C 29/04
(52) U.S. Cl. ...................... 426/113; 426/129; 426/643; 426/389; 426/412; 426/506; 426/521; 426/524; 422/1; 422/39; 452/12; 452/13; 452/15
(58) Field of Search ............................ 426/2, 113, 129, 426/643, 645, 647, 389, 410, 412, 506, 521, 524; 422/39, 1

(56) References Cited

U.S. PATENT DOCUMENTS

| | | | |
|---|---|---|---|
| 550,151 A | * | 11/1895 | Averkamp |
| 2,530,783 A | | 11/1950 | Pogany |
| 2,648,125 A | | 8/1953 | McKenna et al. |
| 3,054,147 A | | 9/1962 | Archibald |

(List continued on next page.)

FOREIGN PATENT DOCUMENTS

| | | | |
|---|---|---|---|
| BE | 1-001-206 | | 8/1989 |
| FR | 2477842 A | | 9/1981 |
| JP | 360049770 A | | 3/1985 |
| JP | 63 094955 | | 4/1988 |
| JP | 02 257864 | | 10/1990 |
| JP | 03039070 A | * | 2/1991 |
| JP | 04 356146 | | 12/1992 |
| JP | 4356156 | | 12/1992 |

OTHER PUBLICATIONS

Mermelstein "High–Pressure Processing Begins" 06–98, Foodtechnology v. 52, No. 6, pp 104–6, 108.

"Cold Pasteurizer Claims Increased Bacteriologic Safety" Meat & Poultry, Oct. 1997, p. 75.

ABB Pressure Systems AB "High Pressure Processing New Opportunities in Food Processing".

Pierpaolo Rovere "The Third Dimension in Food Technology" Technologie Alimentari.

(List continued on next page.)

*Primary Examiner*—Milton I. Cano
*Assistant Examiner*—Drew Becker
(74) *Attorney, Agent, or Firm*—Keaty Professional Law Corporation

(57) ABSTRACT

The invention relates to a process for eliminating pathogenic organisms and other bacteria from raw food products, such as raw shellfish, whereby the molluscan shellfish is exposed to hydrostatic pressure of relatively high value, for example between 20,000 p.s.i. to 150,000 p.s.i. for 1–15 minutes. The process is conducted at minimal elevated temperatures, in the range of above ambient temperature to 150° F., leaving the raw shellfish substantially unaffected, in its desired raw state, such that the pathogenic organisms are destroyed, while sensory characteristics of the raw shellfish remain high. The same process can be used for shucking bivalve mollusks without any mechanical force, with the pressure ranging from 10,000 p.s.i. to 100,000 p.s.i. Taste of raw seafood is enhanced by adding flavor enhancing agents to the pressure vessel before application of pressure.

14 Claims, 2 Drawing Sheets

U.S. PATENT DOCUMENTS

| | | |
|---|---|---|
| 3,462,797 A | 8/1969 | Ashbury |
| 3,471,894 A | 10/1969 | Tasker |
| 3,613,157 A | 10/1971 | Landa et al. |
| 4,383,348 A | 5/1983 | Comparetto |
| 5,213,029 A | 5/1993 | Yutaka |
| 5,288,462 A | 2/1994 | Carter et al. |
| 5,593,714 A | 1/1997 | Hirsch |
| 5,622,678 A | 4/1997 | Hiltawsky et al. |
| 5,639,504 A | 6/1997 | Fernandez et al. |
| 5,679,392 A | 10/1997 | Schegan et al. |
| 5,741,536 A | 4/1998 | Mauer et al. |
| 5,741,538 A | 4/1998 | Stipp et al. |
| 5,741,979 A | 4/1998 | Arndt et al. |
| 5,744,184 A | 4/1998 | Kendall et al. |
| 5,744,188 A | 4/1998 | Kolla et al. |
| 5,773,064 A | 6/1998 | Tesvich et al. |
| 6,033,701 A | 3/2000 | Hirsch |

OTHER PUBLICATIONS

ABB Autoclave System "High Pressure Food Processing".

The National Center for Food Safety and Technology "High Pressure Food Processor is Available for Industrial Contract Runs".

WinSPIRS 2.0, FSTA Abstracts, 1990–1996 (10 pages).

Styles, etal; "Response of *Listeria monocytogenes* and *Vibrio parahaemolyticus* to High static Pressure".

Journal of Food Service, vol. 56, No. 5., 1991.

Cheftel, J.C., "Effeects of high hydrostatic pressure on food constituents: an overview", High Pressure and Biotechnology, vol., 224, 1992.

O.R. Fennema, "Amino Acids, Peptides and Proteins", Food Chemistry, 3rd Ed., 1996, pp 361–362, Marcel Dekker.

\* cited by examiner

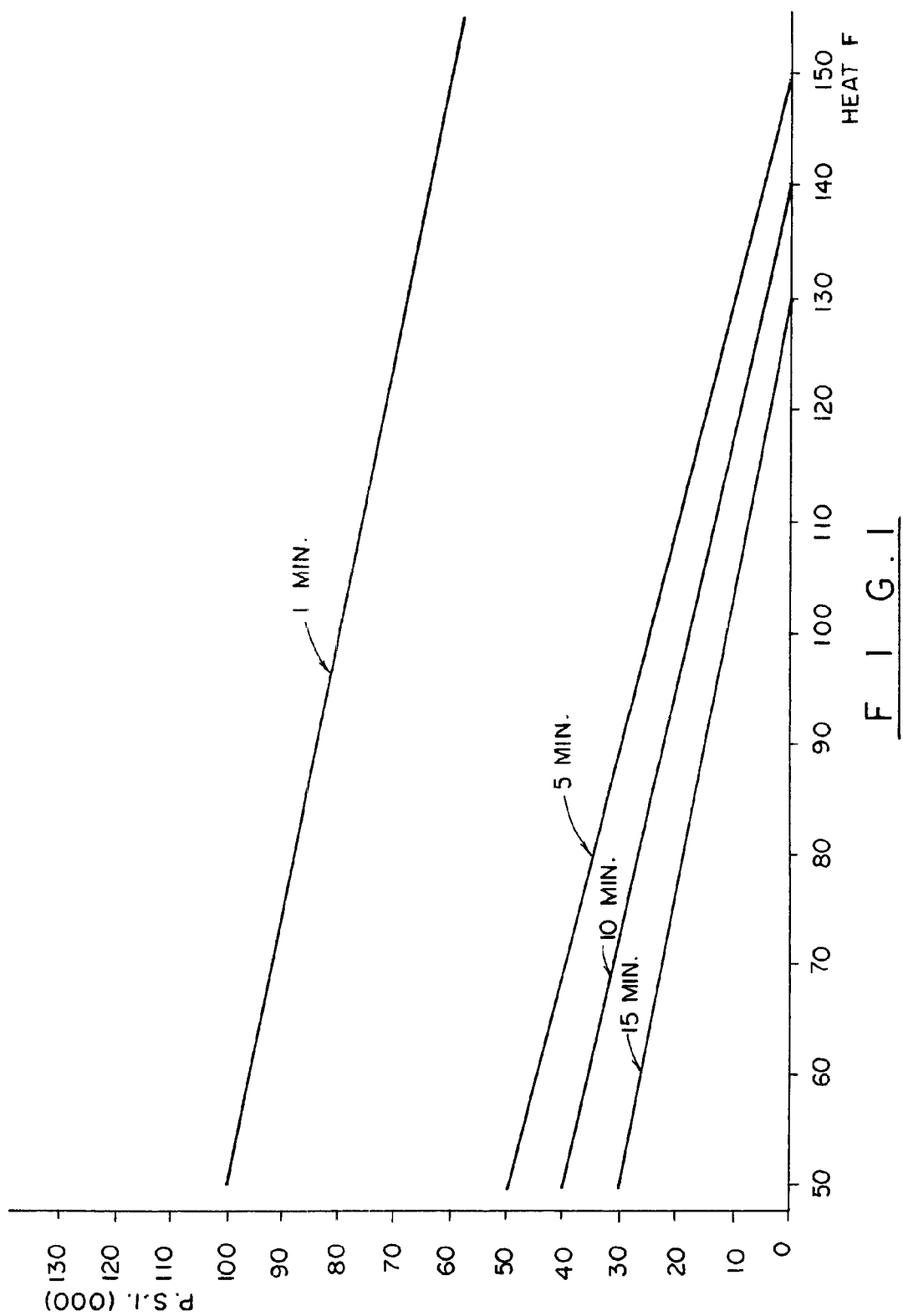

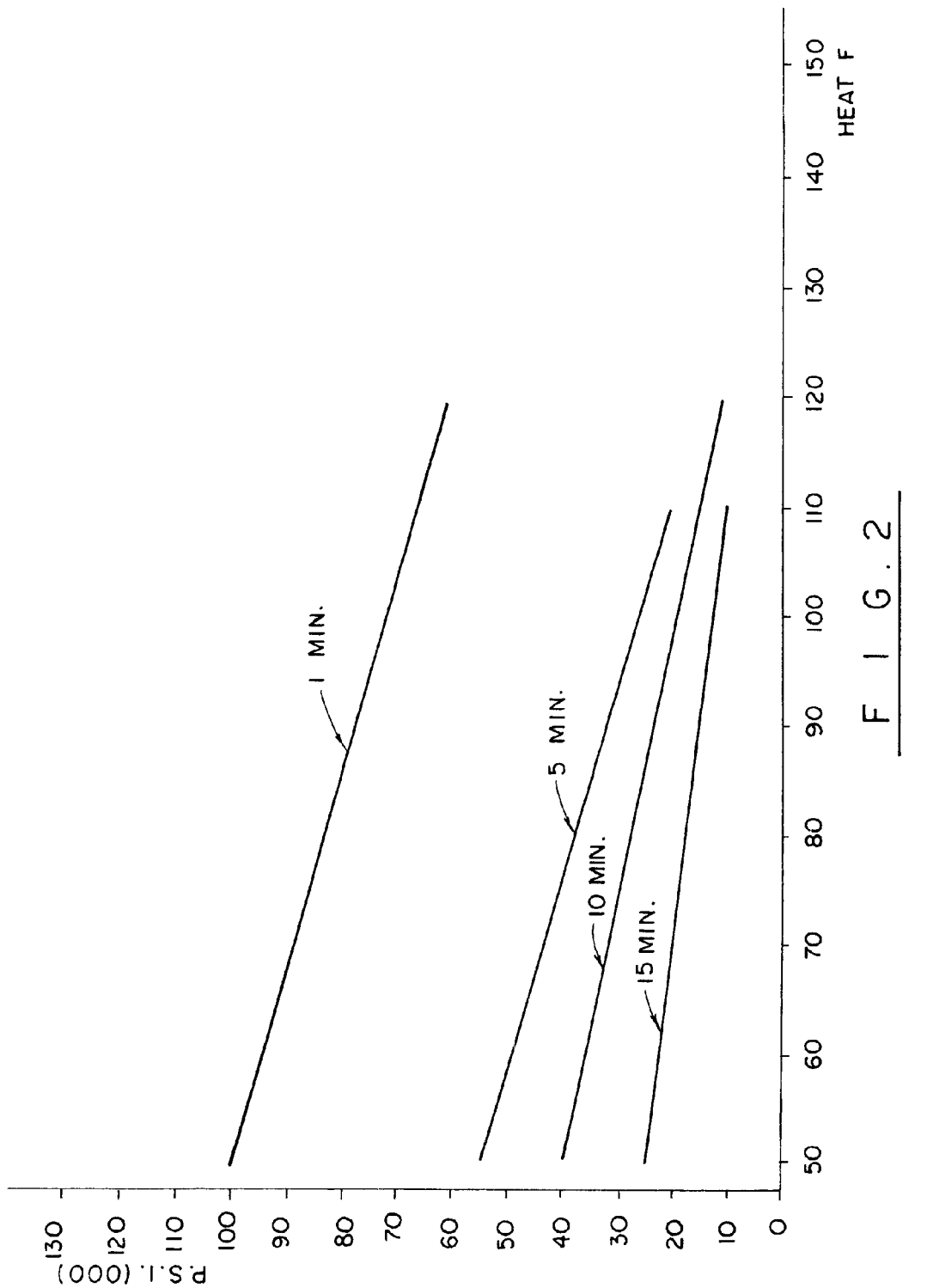

PROCESS OF ELIMINATION OF BACTERIA IN SHELLFISH AND OF SHUCKING SHELLFISH

CROSS REFERENCE TO RELATED APPLICATIONS

This application is a divisional application of Ser. No. 09/302,116 filed on Apr. 29, 1999 now abandoned which is a continuation-in-part of application Ser. No. 9/121,725 filed on Jul. 24, 1998, which claims the benefit of provisional application Ser. No. 60/086,484 filed on May 26, 1998, and provisional application Ser. No. 60/074,582 filed on Feb. 13, 1998 and on my provisional application Ser. No. 60/071,819 filed on Jan. 20, 1998, the full disclosures of which are incorporated by reference herein.

BACKGROUND OF THE INVENTION

This application relates to a process of treatment of raw molluscan shellfish, other crustaceans, and more particularly to a process for destroying bacteria in shellfish and other crustaceans, such as for example bivalve mollusks.

In recent years, considerable attention has been paid in the media to tragic results of consumption of raw oysters where the individuals became infected with life threatening pathogenic organisms. Such bacteria as *Vibrio vulnificus* and *Vibrio parahaemolyticus* live in marine environment, especially in warm waters, usually higher than 25° C. Other organisms of concern are Vibriones: *Vibrio cholerae* O1, *Vibrio cholerae* non-O1, *Vibrio mimicus*, *Vibrio Fluvalis*, *Vibrio furnissii*, *Vibrio hollisae*, *Vibrio alginolyticus*, *Listeria monocytogenes*, Salmonella (nontyphoidal) and *Salmonella typhi*, *Campylobacter jejuni*, *Escherichia coli*, *Yersinia enterocolitica*, *Clostridium botulinum*, *Clostridium perfringens*, Shigella, *Staphylococcus aureus*.

Some other organisms that can cause disease in normal, healthy adults and which were either isolated from seafood or proven pathogen in seafood are: Helminths (*Anisaxis simplex* and other helminths); Viruses: poliovirus, other picornaviruses, Norwalk/Snow Mountain/small round viruses, or SRVs); Hepatitis A and E and non-B Hepatitis, and *bacillus cereus*. Additionally, there is a series of organisms that can cause disease most often in special population groups; these are rotavirus and Listeria.

Further some organisms associated with seafood have uncertain roles as food-borne pathogens; they are *Aeromonas hydrophilla*, *Plesiomonas Shigelloides* and *Edwardsiella tarda*. Some of the above organisms occur naturally in water; some are the result of water pollution, and some are associate with processing and preparation of food, for example cross-contamination or time/temperature abuse, as well as infected food handlers.

*Vibrio Vulnificus* has been isolated from estuarine and marine waters of the U.S. Gulf Coast, east coast, and west coast; it was also reported on other continents. The bacteria may transfer from water to the shellfish inhabiting the body of water, especially filter-feeding mollusks, where bacteria can multiply mostly in the gut region.

Vibrio is a genus of motile curved and rod-shaped Gram-negative bacteria. Other well-known vibriones are *Vibrio cholerae* and *Vibrio Parahaemolyticus*. *Vibrio Parahaemolyticus* is a common cause of gastroenteritis in some cultures, where consumption of food is particularly high, such as for example Japan.

*Vibrio Vulnificus* is a halophilic species, the strains of which are similar to *Vibrio Parahaemolyticus* and *Vibrio alginolyticus*. *Vibrio Vulnificus* thrives in warm waters. Ingesting uncooked or undercooked shellfish that contain vibrios, especially raw oysters, transmits it. After a brief incubation period, often as short as two hours, *Vibrio Vulnificus* causes septicemia and cellulitis. Physical symptoms include indigestion, cramps, nausea, vomiting, headache, weakness, fever and chills.

Usually, this food poisoning subsides spontaneously within two days. Occasionally, however, it is more severe. Persons with pre-existing hepatic disease or compromised immune system are especially in danger. Infection may occur not only through digestion of raw seafood but also from wound infection following exposure to seawater.

While fatal outcomes are extremely rare, the unfortunate events have been widely publicized, making the public aware of a potential life threatening exposure to the Vibriones and other pathogens. The fear of the bacteria poisoning is so high that the federal government issued a special warning advising the public of the potential dangers of raw oyster consumption. It has also been suggested that no harvesting of oysters be conducted during warm months in the Gulf of Mexico, so as to minimize the health risk associated with such food poisoning. Other serious threat is presented by *Vibrio cholerae* that presents a threat to public health and can even cause an epidemic, if not checked in time. Other seafood-associated organisms are listed above.

Public fear of the potential dangers associated with bacteria poisoning through raw oyster consumption adversely affected an important Louisiana industry—oyster harvesting. Market share of Gulf oysters shrunk, and many fishermen found that even oysters harvested from safe beds are not in such a great demand as they used to be and that the price has fallen drastically.

Still, consumption of raw molluscan shellfish and other crustaceans is so widespread in the South that many restaurants continue to carry raw oysters as part of their menu. Even though many restaurants post a warning sign of the possible danger to a segment of the public with liver or immune system disorders it rarely stops dedicated gourmands.

To prevent poisonous consumption of pathogenic organisms, various methods have been suggested for treating raw shellfish, for example with heat or irradiation, in an effort to eliminate or minimize the public health danger. For example, U.S. Pat. No. 5,679,392 (the '392 patent) issued on Oct. 21, 1997 for "Heat Treatment of Raw Molluscan Shellfish" discloses a method for preparing raw molluscan shellfish in the shell or out of the shell employing a mild heat treatment and cold storage.

According to the '392 patent, the shellfish placed in a polymer or metallized bag is lowered into a circulating bath of water at a temperature of between 120° F.–130° F. for 30–45 minutes, after which time it is cooled in a cold water bath to a temperature between 28° F.–32° F. The product is then transferred to a cool water bath, where it is retained for 15–20 minutes and becomes ready for storage in a refrigerated state at 32° F.–34° F. The patent disclosure asserts that the mollusk remains in a raw state and in the shell throughout the process, while the number of pathogenic bacteria is reduced to an undetectable level.

While this process may be satisfactory for some products, it is believed that heating of the shellfish will affect the sensory qualities of the product, making it less desirable for consumption as raw shellfish. Heat treatment as a means of controlling microorganisms and bacteria in food products results in diminished taste and reduced nutritional content.

Therefore, elevated temperatures are considered unsatisfactory for processing of raw oysters where the purpose of the process is to retain sensory qualities of oysters and sell them on a half-shell.

Ionizing irradiation was tested as one of the methods of destroying harmful bacteria in live shellfish. However, this process is relatively expensive and has not yet obtained approval by the Federal Food and Drug Administration. Other known attempts to purify raw oysters involve depuration, wherein oysters are soaked in a tank of water for days at a time in an attempt to purge and cleanse the mollusk of the bacteria. So far, there have been no reports on the success of this method in destruction of bacteria in raw oysters.

Other suggested methods of destroying *Vibrio Vulnificus* involve cold, freezing, vacuum packaging, use of GRAS (diacetyl) compounds, suspension relaying into offshore water, and food condiment treatment. While some of these methods are relatively simple to implement, most of them have problems—either too expensive, ineffective, time consuming, or failed to receive FDA approval.

It was also suggested to refrigerate oysters immediately after harvesting at 7.2° C. or less in an attempt to control multiplication of bacteria. However, cold treatment greatly reduces but does not eliminate bacteria present in oysters during harvesting for a storage period considered normal for shucked or shell stock oysters.

Heat treatment, for example at 50° C. for 10 minutes, kills the bacteria; this method is currently used on a commercial scale for live shell stock oysters. However, this method may also kill the oysters. Additional drawback of this method is that it is difficult to control the high temperature of commercial size batches when the size and shell thickness of oysters differ from batch to batch.

Vacuum packaging combined with freezing tends to reduce the level of *Vibrio Vulnificus*. However, this method is relatively expensive, reduces quality, so that the product treated in this manner may not find a wide acceptance with the public. When diacetyl, an FDA approved preservative was used on raw oysters, at levels of 0.05% or greater, it demonstrated decrease in the level of the bacteria, but did not guarantee complete elimination thereof.

When oysters were relayed into high salinity environment of offshore waters, *Vibrio Vulnificus* bacteria were reported to decrease to a level found in oysters normally harvested in more cold months, where no reported cases of food poisoning were recorded. However, oyster predators and parasites are a factor with this very expensive method. The use of UV light and micro-filtration treatment of seawater did not depurate the bacteria from oyster tissue.

Some studies examined the effect of Tabasco sauce on freshly shucked oysters. In about ten minutes, the level of *Vibrio Vulnificus* on the surface of tested oysters was significantly reduced, but the levels of the bacteria within the oyster meat remained almost unaffected.

In recent years, a new technology has emerged—high pressure processing of foods. The leading manufacturer of high-pressure food processors is ABB Pressure Systems AB of Vasteras, Sweden and its affiliate, ABB Autoclave Systems, Inc. of Columbus, Ohio. According to industry sources, this company makes equipment for processing of juices, fruits, vegetables, fruit-based beverages, jams, sauces, soups and meats. The company's literature claims that most bacteria in food can be killed by pressures in the range of 400–800 MPa (58,000 p.s.i.–116,000 p.s.i.).

A Canadian company, GEC ALSTHOM, developed a cold pasteurizing system, which utilizes high hydrostatic pressure for processing thermal-sensitive packaged food products. According to that company's literature, pressure modifies cell membrane permeability of microorganisms. As a result, bacteria are inactivated or die. It is recommended that the treated products are kept chilled at 4° C. in order to reduce bacteriologic risk. The process is said to triple shelf life of the products.

Other companies in Europe and the United States continue research in the high-pressure food processing area.

High pressure is said to be preferable to heat treatment because high pressure does not destroy many of the substances found in fresh foods, such as vitamins, chlorophyll and aroma substances. As a result, refrigerated shelf life of fruit and vegetable products, as well as high-acid products can be increased from several weeks to several months. Most importantly for the purposes of the present invention, high pressure treatment is believed to increase food safety by reducing bacteria in the processed products, while retaining the products' nutritional value, color, flavor and texture.

An additional factor that should be taken into consideration when selling raw seafood is sensory qualities of the product, its texture, taste and appearance. Among connoisseurs, it is recognized that a good raw oyster has a mild salty taste. An ideal oyster has about 12 parts per thousand of salt in the juice. However, in some cases, due to various environmental factors, oysters are not salty, which makes them less desirable from the standpoint of marketing a perfect product. High-pressure treatment is believed to provide a solution to the problem of retaining sensory qualities of seafood.

The principle of cold isostatic (uniformly applied) pressure processing is relatively simple—food is placed in a container and is surrounded by a pressure medium, usually water. An external pressure intensifier to a predetermined value pressurizes the vessel. Pressure is fed into the pressure vessel where food products have been deposited. Pressure in such a vessel is distributed evenly through all parts of the product, thereby preventing mechanical damage of delicate food products. The process may be conducted with no or minimal heat treatment.

Another problem that the present invention addresses is mechanical shucking of oysters. Seafood processing plants employ skillful workers for the preparation of oysters for packaging in jars and other containers for sale to the customers. Restaurants that serve raw oysters also employ special personnel for shucking oysters before serving the delicacy on a half shell.

The process of oyster shucking involves cutting of the connective tissue of oyster adductor muscle that is normally attached to the shell and keeps the shell halves tightly closed. More experienced workers perform this task relatively well, while novices can damage the product and cut through the body of the oyster, thereby reducing the quality and increasing the cost.

At present, the applicant is not aware of any commercial utilized method of mechanical shucking of raw oysters. It is estimated that about 80% of the cost of a shucked oyster are due to the labor-intensive hand-shucking process.

The present invention contemplates elimination of drawbacks associated with the prior art and reduction or elimination of harmful bacteria in raw shellfish, as well as shucking of oysters without any substantial affect on the sensory qualities of raw shellfish. Additionally, a new method of processing seafood products with enhancement of taste is disclosed.

SUMMARY OF THE INVENTION

It is, therefore, an object of the present invention to provide a process for reducing or elimination of pathogenic organisms from raw molluscan shellfish, such as oysters, clams, and mussels.

It is another object of the present invention to provide a method of reducing harmful bacteria in raw shellfish without substantially affecting its sensory qualities.

A further object of the present invention is to provide a method of shucking bivalve mollusks, such as oysters and other shellfish that does not involve manual cutting of the adductor muscle.

Another object of the invention is to provide a method of seafood processing that allows to enhance the taste of the product without adversely affecting the textural qualities of the product.

These and other objects of the present invention are achieved through a provision of a process that includes high-pressure treatment of raw shellfish, the process comprising the step of exposing the shellfish to relatively high hydrostatic pressure. The process is conducted at ambient temperatures, or with minimal heat, exposing the molluscan shellfish to the liquid pressure of between 10,000 p.s.i. to 100,000 p.s.i. for 1–15 minutes. Minimal heat in the range of ambient temperature to about 150° F. is used to decrease the pressure and/or time required for processing of the food items. The higher the temperature, the less time and pressure is required to eliminate pathogens in raw seafood products.

As a result of the high-pressure treatment, pathogenic organisms, such as bacteria *Vibrio Vulnificus, E-coli* and Listeria are destroyed without substantially adversely affecting the sensory qualities of the shellfish and shelf life of the product. At the same time, the connective tissues of molluscan adductor muscle holding the two shell halves is separated from the shells, and the molluscan shells open without any manual cutting of the muscle.

Additional step in the process is provided for enhancing sensory qualities of raw product. According to this step, salt, lemon juice, hot sauces and other flavorings are added to the water that is used for pressurization in the pressure chamber. Because water compresses about 11 percent at 50,000 p.s.i., the salt water penetrates into raw seafood to improve the taste of the final product.

BRIEF DESCRIPTION OF THE DRAWINGS

Reference will now be made to the drawings, wherein FIG. 1 is a schematic diagram illustrating correlation between heat, pressure and time factors in elimination of pathogens in food products.

FIG. 2 is a schematic diagram illustrating heat, pressure and time factors when shucking raw oysters.

DETAILED DESCRIPTION OF THE PREFERRED EMBODIMENT

The new process for the treatment of raw molluscan shellfish according to the present invention will now be described in more detail. According to this process, raw shellfish, such as oysters, clams and mussels are treated in a high-pressure environment with minimal application of heat.

The non-thermal method of food preservation, high pressure processing, has been known in use in relation to meat product, fruits, and other products. However, no attempts, except for the method disclosed in the parent application of the present inventor, have been known so far to treat such fragile, easily damaged products as raw shellfish. Traditionally, shellfish, such as crab, crawfish and oyster deteriorate in quality immediately upon death. For this reason, they are usually shipped either live, at considerable expense in refrigerated containers, or fresh frozen.

None of these approaches could be applied to insure bacteria-free raw shellfish that would satisfy public demand for raw oysters eaten on a half shell. Bearing in mind the importance of regaining markets and consumer confidence in Gulf oysters, fishermen are looking for feasible methods of processing shellfish without destroying its nutritional and sensory values.

According to the present invention, crustaceans, or molluscan shellfish, for example, shellstock oysters, are individually tied with a flexible band, for example a rubber band or plastic shrink tape band, and placed in a pressure vessel that contains a pressure transmitting fluid, for example, water. If desired, the shellfish can be prepackaged in pouches and then loaded into the pressure vessel. The vessel is then closed and pressurized between about 10,000 p.s.i. to 100,000 p.s.i. for 1–15 minutes at a temperature of between ambient temperature and 150° F.

During experimental tests, bacteria, such as vibriones, were virtually eliminated when oysters were exposed to pressure of about 50,000 p.s.i. for 5 minutes at ambient temperature. When the pressure was about 40,000 p.s.i., it took about 10 minutes at ambient temperature to kill substantially all bacteria, and when oysters were treated for 15 minutes at ambient temperature the pressure could be reduced to about 30,000 p.s.i. If it is desired to reduce the treatment time, the pressure and temperature values have to be increased. In such a case, the temperature range can be from ambient temperature to as high as 150° F. and pressure up to 100,000 p.s.i.

During tests, it was observed that the higher the pressure and temperature, the less time it takes to destroy bacteria, such as *Vibrio Vulnificus* in raw oysters. For example, when shellstock oysters were treated at hydrostatic pressure of 50,000 p.s.i. for 5 minutes at ambient temperature, seeded bacteria *Vibrio Vulnificus* was reduced from 24,000 MPN/g to 0 MPN/g (here, MPN stands for Most Probable Number).

During processing, the pressurized liquid remained at ambient or slightly elevated temperature, while the pressure was transmitted uniformly to the product inside the pressure vessel. It was determined that for every 14,500 p.s.i. of pressure increase, the temperature in the pressure vessel increased by about 3 degrees Celsius. The temperature decreased as soon as the pressurization stopped. The resultant product did not significantly change in volume and no mechanical damage was observed to the delicate food product.

During experimental tests, it was determined that treatment of the product at hydrostatic pressure of 50,000 p.s.i. for 5 minutes achieved the desired result with all of the treated shellfish, and longer treatment time allowed to reduce both pressure and temperature values to a considerable degree. Some experiments showed that preferred pressures are in the range of 45,000 p.s.i.

It is further envisioned that other types of bacteria, in addition to *Vibrio Vulnificus* can be eliminated or substantially reduced in raw shellfish with the use of the present invention, therefore increasing the shelf life of a product.

During experiments with raw oysters, an unexpected phenomenon was observed— the oyster adductor muscle connective tissue attachment at the shell denatured to gel formation at pressure as low as 25,000 p.s.i. and treatment time of 15 minutes at ambient temperature. First, it was observed that a gap developed between the shell halves. When the shell halves were pried open, the oyster easily slid out of the shell in perfect condition. No mechanical cutting was necessary. The denaturing of muscle proteins, including actin and myosin and connective tissues to a gelatin transition is a result of disruption of non-covalent interactions in tertiary protein structures. The potential commercial utilization of this chemical denaturing for mechanical shucking of live shell stock oysters has not been previously tested or observed.

To prevent escape of water or "bleeding" of oysters during the high pressure treatment, oysters need to be mechanically banded, for example with a flexible band, such as a rubber band, or a plastic shrink tape band before placement in the processing vessel. The band keeps the shell halves tightly closed, thereby helping in preservation of natural condition of raw oysters that can be later served on a half shell. The processed oysters can be shipped to customers with the bands attached, and the consumer will then only need to remove the band to open the oysters. Oysters that will be immediately shucked do not need to be banded.

During the tests, it was observed that longer treatment time allows decreasing of pressure and temperature values while shucking oysters without any mechanical intervention. If, for example, it required about fifteen minutes at 25,000 p.s.i. ambient temperature to shuck oysters, a 10-minute processing required increase in temperature to about 85° F. or increase in the pressure value to about 40,000 p.s.i. at ambient temperature. When oysters were processed for only five minutes, the shucking occurred at 55,000 p.s.i. at ambient temperature. Of course, higher pressure values, up to 100,000 p.s.i. can be used, depending on the available equipment. In such a case, the treatment time may be reduced to 1 minute with the temperature range from ambient temperature to 120° F.

During processing, raw shellfish, such as an oyster is individually banded to prevent escape of water from the shell when the oyster is removed from the chamber. The oysters are placed in a basket for handing purposes. Oysters can also be placed in flexible bag filled with water prior to being inserted into the pressure chambers. The pressure chamber is filled with pressure medium, such as water. The basket is then inserted into the pressure chamber of a vessel, and the lids are closed. The loaded vessel is then secured by a yoke that serves as a pressure holding and safety device during high pressure application.

An external pressure source is used for supplying pressure to the pressure chamber of the vessel, where the oysters have been deposited. According to Pascal's Law, this hydrostatic pressure has a uniform effect on all materials inside the pressure vessel. Equally distributed pressure affects the oyster meat inside the shells and eliminates *Vibrio Vulnificus* and other pathogens from the oyster meat without any mechanical damage to raw oysters.

Oyster meat has a high water content, which makes high-pressure treatment a particularly advantageous type of processing for raw oysters. At the same time, the adductor muscle detaches from the shell, and shell halves are ready to separate, when necessary, for serving oysters on half shelf, or for easy shucking of oysters or other molluscan shellfish.

While the oysters are processed, the pressure in the chambers is rapidly elevated to between 10,000 p.s.i. and 100,000 p.s.i., and the temperature is increased to between ambient temperature and 150° F. The pressure is retained for about one to fifteen minutes, depending on the selected pressure and temperature value. For lower pressures, the time of treatment and temperature are greater, while higher pressure requires less treatment time and less temperature. A slight increase in temperature would decrease the amount of pressure required. The pathogenic microorganisms are eliminated, while nutritional value and sensory qualities of raw oysters are not affected.

Experiments conducted with raw oysters demonstrated that *Vibrio Vulnificus* bacteria were eliminated at every test run with any size oysters when pressure was in the range of 45,000 p.s.i. and treatment time was about 5 minutes at ambient temperature. Shucking of oysters occurs at much lower pressures, about 25,000 p.s.i. when oysters are treated for 15 minutes at ambient temperatures. Therefore, it is envisioned that for processes not requiring bacteria elimination, but only shucking, the pressure vessels can be run at lower pressures and lower temperatures.

Oysters can be shucked at lower pressures and then the raw oyster meat can be packaged in plastic bags. The packages are then pressurized at higher pressures to eliminate the harmful pathogens.

In order to enhance the taste of raw seafood, such as oysters, various spices and flavorings can be added to the pressurized fluid. For example, salt, lemon juice, hot spices and other flavor enhancing additives may be deposited into the pressure vessel along with water before pressurization begins. During pressure processing, the flavor enhancing substances penetrate into the raw product and make the product more desirable to consumers.

Once the batch in the loaded vessel has been treated for the pre-determined period of time, the securing yoke is rolled away from that vessel and engaged with the second vessel. While the product is processed in the second vessel, the treated product from the first vessel can be unloaded, and a new batch of products deposited therein. The single yoke may serve as a pressure holding and safety device for two separate pressure vessels, if desired.

The method in accordance with the present invention does not cause thermal damage or denaturing of the delicate product as the temperature increase is minimal. At the same time, no mechanical damage to the delicate oyster meat occurs, as the shell protects the oyster from any contact with the mechanical parts of the pressure vessels.

The method of the present invention has minimal impact on the environment. Cooling water can be recycled through the use of conventional equipment. Conventional electromechanical systems can be used to generate high pressure inside the pressure vessels.

It is envisioned that various types of molluscan shellfish, such as clams, muscles, abalone, and other bivalve mollusks can be processed with the method of the present invention without mechanical damage or deterioration of sensory properties of the product. Once the bacteria are eliminated, the product can be shipped for consumption in a raw state. It is believed that the process of the present invention can be implemented for elimination of other bacteria, in addition to *Vibrio Vulnificus*, such as *E-coli, Vibrio alginolyticus, Vibrio parahaemolyticus, Listeria monocytogenes, Vibrio cholerae O1, Vibrio cholerae* non-O1, *Vibrio mimicus, Vibrio Fluvalis, Vibrio furnissii, Vibrio hollisae, Vibrio alginolyticus, Listeria monocytogenes*, Salmonella (nontyphoidal) and *Salmonella typhi, Campylobacter jejuni, Escherichia coli, Yersinia enterocolitica, Clostridium botulinum, Clostridium perfringens*, Shigella, Staphylococcus aureus; Helminths (*Anisaxis simplex* and other helminths); Viruses: poliovirus, other picornaviruses, Norwalk/Snow Mountain/small round viruses, or SRVs); Hepatitis A and E and non-B Hepatitis, and *bacillus cereus*; rotavirus and Listeria; *Aeromonas hydrophilla, Plesiomonas Shigelloides* and *Edwardsiella tarda*.

The shellfish can be harvested even in warm months, and the public will be assured of the product safety. Naturally contaminated Gulf Coast oysters that can contain thousands of harmful *Vibrio Vulnificus* and other vibriones can be successfully processed with the apparatus and method of the present invention.

Other seafood items can be similarly processed with the method and apparatus of the present invention. If desired, oysters and other products to be treated in the system of the present invention can be placed in baskets in a refrigerator/cooler, so as to prevent bacteria multiplication, while the products wait their turn in the pressure vessels. After processing, the shellfish should be placed in a cooler as soon as possible. The processed shellfish should be preferably kept at between 32° F. and 36° F. until it is sold and consumed by a customer.

The external source of pressure can be any conventional pressurizing means, such as hydraulic motor, electrical motor and the like. Other means for building up pressure in the pressure chambers can be successfully employed without affecting the advantages afforded through the practice of the present invention.

Many changes and modifications can be made in the process of this invention without departing from the spirit thereof. I, therefore, pray that my rights to this invention be limited only by the scope of the appended claims.

I claim:

1. A method of eliminating pathogenic organisms in raw molluscan shellfish and crustaceans, comprising:

exposing raw molluscan shellfish and crustaceans to a predetermined high hydrostatic pressure and a temperature above ambient temperature for a predetermined period of time sufficient to cause destruction of the pathogenic organisms without substantially affecting sensory characteristics of said raw molluscan shellfish and crustaceans.

2. A method of eliminating pathogenic organisms in raw molluscan shellfish and crustaceans, comprising:

exposing said raw molluscan shellfish and crustaceans to hydrostatic pressure of between about 10,000 p.s.i. to about 100,000 p.s.i. for 1–15 minutes and temperature from above ambient to 150 degrees Fahrenheit sufficient to cause destruction of the pathogenic organisms without substantially affecting sensory characteristics of said raw molluscan shellfish and crustaceans.

3. A process of destroying bacteria in raw molluscan shellfish, comprising the steps of:

providing a pressure vessel;

depositing said raw molluscan shellfish into said pressure vessel;

loading a pressure transmitting liquid into said pressure vessel;

pressurizing said pressure vessel to between about 10,000 p.s.i. and 100,000 p.s.i., while maintaining temperature in said pressure vessel from above ambient to 150 degrees Fahrenheit, thereby causing destruction of said bacteria, while staining sensory characteristics of said raw molluscan shellfish.

4. The process of claim 3, wherein said raw molluscan shellfish is exposed to isostatic pressure for 1–15 minutes.

5. A process of treating raw molluscan shellfish, which comprises: exposing said raw molluscan shellfish to a hydrostatic pressure of between 10,000 p.s.i. to 100,000 p.s.i. for 1–15 minutes at a temperature from above ambient to 150 degrees Fahrenheit, thereby destroying pathogenic organisms in said raw molluscan shellfish.

6. The process of claim 5, wherein said shellfish is enclosed in liquid-impermeable bags filled with pressurizable liquid prior to exposing said shellfish to hydrostatic pressure.

7. A method of extending shelf life of raw seafood, comprising the steps of:

exposing raw seafood to predetermined hydrostatic pressure at a temperature above ambient for a predetermined period of time sufficient to cause destruction of the pathogenic organisms without substantially affecting sensory characteristics of said raw seafood.

8. A method of enhancing sensory quality of raw seafood, comprising the steps of:

providing a pressure vessel;

depositing said raw seafood into said pressure vessel;

loading a pressure transmitting liquid into said pressure vessel;

depositing flavor enhancing agents into said pressure vessel;

pressurizing said pressure vessel to between about 10,000 p.s.i. and 100,000 p.s.i.;

maintaining temperature in said pressure vessel from above ambient to 150 degrees Fahrenheit, for a period of 1 to 15 minutes, thereby causing said flavor enhancing agents to penetrate into said raw seafood and impart a desired flavor to said raw seafood, while retaining sensory characteristics of said raw seafood.

9. A method of shucking a raw bivalve mollusk, comprising the steps of:

exposing said raw bivalve mollusk to predetermined high hydrostatic pressure and elevated temperature above ambient for a predetermined time period sufficient to cause detachment of an adductor muscle from a shell of said mollusk and opening of the molluscan shell without substantially affecting sensory characteristics of the raw bivalve mollusk.

10. A method of shucking a raw bivalve mollusk, comprising the steps of:

exposing said raw bivalve mollusk to hydrostatic pressure and elevated temperature above ambient for a time period sufficient to cause detachment of an adductor muscle from a shell of said mollusk and opening of the molluscan shell without substantially affecting sensory characteristics of raw mollusk, and wherein said mollusk is exposed to hydrostatic pressure of at least 10,000 p.s.i. for a period of 1–15 minutes at a temperature from above ambient to 150 degrees Fahrenheit.

11. A process of shucking bivalve mollusks, comprising the steps of:

wrapping a flexible detachable band around individual bivalve mollusks;

positioning said bivalve mollusks in a pressure vessel;

applying predetermined high hydrostatic pressure above atmospheric pressure to said bivalve mollusks in the pressure vessel for a predetermined period of time and at an elevated temperature above ambient temperature sufficient to cause detachment of an adductor muscle from shells of said mollusks;

removing said bands from said mollusks and opening said mollusks without cutting said adductor muscles.

12. A process of shucking bivalve mollusks, comprising the steps of:

wrapping a flexible detachable band around individual bivalve mollusks;

positioning said bivalve mollusks in a pressure vessel;

applying hydrostatic pressure to said bivalve mollusks in the pressure vessel for a period of time and at a temperature sufficient to cause detachment of an adductor muscle from shells of said bivalve mollusks;

removing said bands from said bivalve mollusks and opening said bivalve mollusks without cutting said adductor muscles, and wherein said mollusks are exposed to hydrostatic pressure of at least 20,000 p.s.i. for a period of about 5 minutes at a temperature of about 110 degrees Fahrenheit.

13. A process of shucking bivalve mollusks, comprising the steps of:

wrapping a flexible detachable band around individual bivalve mollusks;

positioning said bivalve mollusks in a pressure vessel;

applying hydrostatic pressure to said bivalve mollusks in the pressure vessel for a period of time and at a temperature sufficient to cause detachment of an adductor muscle from shells of said bivalve mollusks;

removing said bands from said bivalve mollusks and opening said bivalve mollusks without cutting said adductor muscles, and wherein said mollusks are exposed to a temperature of about 75 degrees Fahrenheit at pressure of about 40,000 p.s.i. for a period of 5 minutes.

14. A process of shucking bivalve mollusks, comprising the steps of:

wrapping a flexible detachable band around individual bivalve mollusks;

positioning said bivalve mollusks in a pressure vessel;

applying hydrostatic pressure to said bivalve mollusks in the pressure vessel for a period of time and at a temperature sufficient to cause detachment of an adductor muscle from shells of said bivalve mollusks;

removing said bands from said bivalve mollusks and opening said mollusks without cutting said adductor muscles, and wherein said bivalve mollusks are exposed to a temperature of 110 degrees Fahrenheit at pressure of about 10,000 p.s.i. for a period of 15 minutes.

* * * * *